United States Patent
McCoy et al.

(10) Patent No.: US 7,154,528 B2
(45) Date of Patent: Dec. 26, 2006

(54) APPARATUS FOR PLACING PRIMARY IMAGE IN REGISTRATION WITH LENTICULAR LENS IN SYSTEM FOR USING BINOCULAR FUSING TO PRODUCE SECONDARY 3D IMAGE FROM PRIMARY IMAGE

(76) Inventors: Randall E. McCoy, 28331 Great Cove Rd., Fort Littleton, PA (US) 17223; William C. Farley, 8 Turnberry Ct., Turnersville, NJ (US) 08012

( * ) Notice: Subject to any disclaimer, the term of this patent is extended or adjusted under 35 U.S.C. 154(b) by 544 days.

(21) Appl. No.: 10/246,381

(22) Filed: Sep. 18, 2002

(65) Prior Publication Data

US 2004/0061775 A1    Apr. 1, 2004

(51) Int. Cl.
*H04N 9/47* (2006.01)
*H04N 13/04* (2006.01)
*H04N 15/00* (2006.01)

(52) U.S. Cl. .......................... 348/59; 359/463

(58) Field of Classification Search .............. 348/59; 359/463; 396/327, 330
See application file for complete search history.

(56) References Cited

U.S. PATENT DOCUMENTS

| 5,493,427 | A | * | 2/1996 | Nomura et al. ................. 349/5 |
| 5,825,541 | A | * | 10/1998 | Imai ............................ 359/464 |
| 6,239,853 | B1 | * | 5/2001 | Winker et al. .............. 349/117 |
| 6,614,552 | B1 | * | 9/2003 | Davies et al. .............. 358/1.18 |
| 2001/0012054 | A1 | * | 8/2001 | Sudo ............................ 348/51 |

* cited by examiner

*Primary Examiner*—Young Lee
*Assistant Examiner*—Jeremiah Huber
(74) *Attorney, Agent, or Firm*—Tod R. Nissle, P.C.

(57) ABSTRACT

Digital binocular fusing apparatus places a primary image in registration with a lenticular lens to produce a secondary 3D image from the primary image. The apparatus includes a lens array, a display mounted behind the lens array and including a primary image and reference marks, a primary image orientation adjustment system for receiving registration adjustment signals to adjust the position of the primary image and the reference marks, a sensor to detect the position of the reference marks and generate position identification signals, and, a registration control for receiving the position identification signals, determining if the primary image is in registration with the lens array, and, if necessary, generating registration adjustment signals and transmitting the registration adjustment signals to the primary image orientation adjustment system.

5 Claims, 6 Drawing Sheets

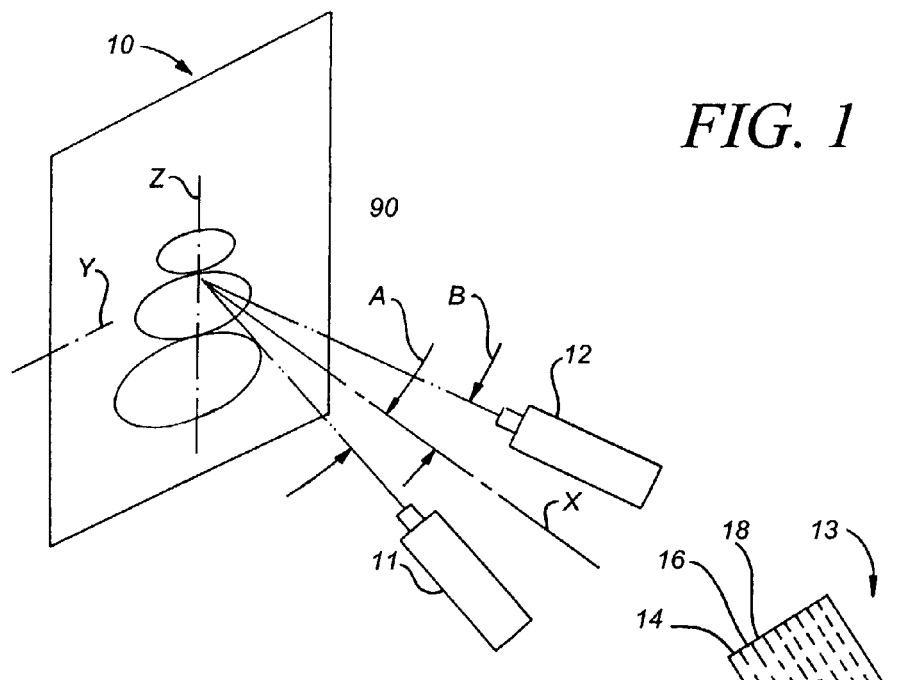
FIG. 1
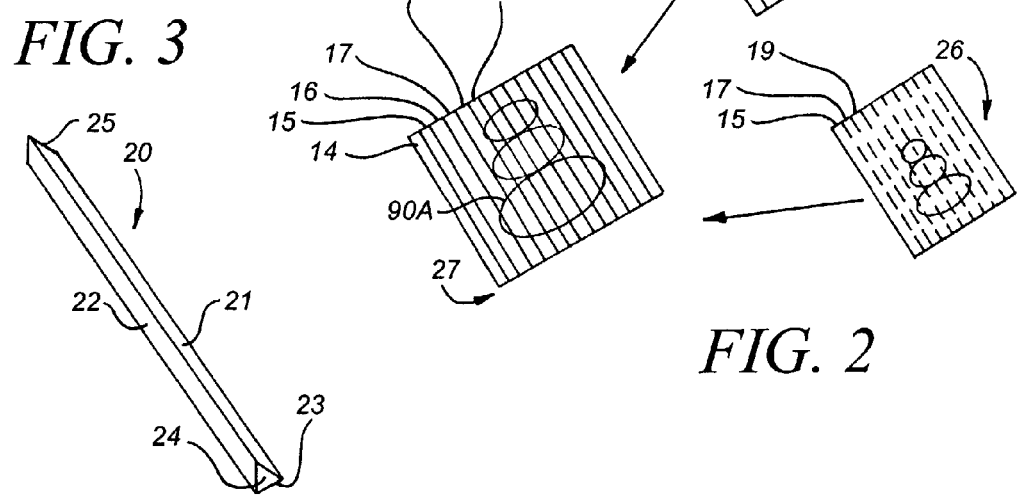
FIG. 3
FIG. 2

APPARATUS FOR PLACING PRIMARY IMAGE IN REGISTRATION WITH LENTICULAR LENS IN SYSTEM FOR USING BINOCULAR FUSING TO PRODUCE SECONDARY 3D IMAGE FROM PRIMARY IMAGE

CROSS-REFERENCE TO RELATED INVENTIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

This invention relates to optical apparatus.

More particularly, the invention relates to optical apparatus that forms a primary image by interpolating pictures of an object, each picture being taken by a camera that is, for each picture, pointed at a common point on the object and is at a different angular position with respect to the object.

In a further respect, the invention relates to optical apparatus that forms on a display a primary image comprised of sequentially alternating interpolated sections from a plurality of pictures and that places each section in registration with a lens, each lens being associated with at least one of the interpolated sections and normally only being viewable by one eye of a individual looking at the display.

In another respect, the invention relates to optical apparatus that maintains a primary image in registration with a plurality of lens, the primary image being comprised of sequentially alternating interpolated sections from a plurality of pictures.

(2) Description of Related Art Including Information Disclosed Under 37 CFR 1.97 and 1.98

It is well known to produce a 3D image by permanently laminating a lens array on a piece of material on which a primary image is formed.

The lens array is comprised of a plurality of transparent elongate vertical lenticular sections. Each lenticular section typically has a triangular cross section and includes a pair of canted viewing surfaces, or lens. One viewing surface (or lens) is seen only by a viewer's right eye. The other viewing surface (or lens) is seen only by a viewer's left eye. Each lens of a lenticular section comprises one-half of the section.

The primary image is comprised of a plurality of sequentially alternating interpolated parallel adjacent elongate strips cut from a plurality of pictures. Each picture is produced by taking a photograph of the same object. Each photograph, however, shows the object when viewed from a different angle. If the primary image is comprised of strips from only two pictures, then the first sequential strip is from the first picture, the second sequential strip is from the second picture, the third sequential strip is from the first picture, the fourth sequential strip is from the second picture, etc. Each sequential pair of strips is in registration with and is beneath one of the lenticular sections. Each strip beneath a lenticular section is viewable through only one viewing surface, or lens, of the lenticular section.

While the laminate construction described above is well known, it would be useful if a 3D image could be produced when an individual is viewing a liquid crystal display, a CRT, or another electronic display, particularly if the image depicted on the display is changing or is moving across the display.

Accordingly, it would be highly desirable to provide an apparatus which could, while selectively activating pixels in a display to produce a primary image, use binocular fusing to produce a 3D image for an individual viewing the display.

Therefore, it is a principal object of the instant invention to provide an improved apparatus for producing a three dimensional image.

Another object of the invention is to provide an improved apparatus that functions both to activate selectively pixels to produce a primary image and to produce from the primary image a three dimensional secondary image.

Still another object of the invention is to provide an improved apparatus that enables a movie, video game, or other visual presentation to be seen in three dimensions without requiring the use of special glasses or other optical apparatus mounted on the head or adjacent the eyes of a viewer.

A further object of the invention is to provide an improved apparatus that functions to activate selectively pixels to produce a primary image at a selected position with respect to a lens array such that the lens array produces a secondary image of the primary image.

Still another object of the invention is to provide an improved apparatus of the type described that can determine when pixels in the primary image are in registration with the lens array.

Yet a further object of the invention is to provide an improved apparatus of the type described that can adjust the locations of pixels in the primary image into registration with a lens array.

BRIEF DESCRIPTION OF THE SEVERAL VIEWS OF THE DRAWING(S)

These and other, further and more specific objects and advantages of the invention will be apparent to those skilled in the art from the following detailed description thereof, taken in conjunction with the drawings, in which:

FIG. 1 is a perspective view illustrating how a camera or cameras are used to take pictures of an object from different angles;

FIG. 2 is a composite diagram illustrating how pictures taken with the cameras in FIG. 1 are disassembled into strips, which strips are interpolated to produce a layer of material including a primary image formed on top of the layer of material;

FIG. 3 is a perspective view illustrating a lenticular section used in a lens array;

BRIEF SUMMARY OF THE INVENTION

Figure 4:
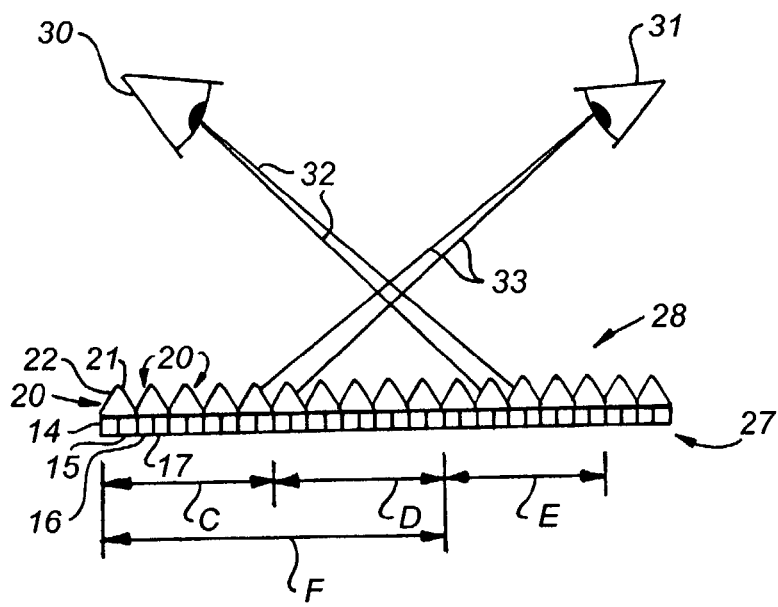
FIG. 4 is a side view illustrating a lens array mounted on top of the layer of material of FIG. 2 such that the primary image formed on top of the layer can be viewed through the lens array.

Briefly, in accordance with the invention, we provide improved digital binocular fusing apparatus. The apparatus includes a lens array comprising a plurality of elongate generally parallel adjacent lenticular sections, each section including at least first and second viewing surfaces each canted with respect to the other; a display mounted behind the lens array and including a plurality of pixels, a system for selectively activating the pixels to produce a primary image and a plurality of reference marks; a primary image orientation adjustment system for receiving registration adjustment signals and adjusting the position of the primary image and reference marks with respect to the lens array, the system adjusting simultaneously the position of the primary image and the reference marks; a sensor system for detecting the position of the reference marks and generating position identification signals; and, a registration control system for receiving the position identification signals, for determining if the primary image is in registration with the lens array, and, if necessary, for generating registration adjustment signals, and for transmitting the registration adjustment signals to the primary image orientation adjustment system.

In another embodiment of the invention, we provide improved digital binocular fusing apparatus. The apparatus includes a lens array comprising a plurality of elongate generally parallel lenticular sections, each section including at least first and second viewing surfaces each canted with respect to the other; a display mounted behind the lens array and including a plurality of pixels, and a system for selectively activating the pixels to produce a primary image; a primary image orientation adjustment system for receiving registration adjustment signals and adjusting the position of the primary image with respect to the lens array; a sensor system for detecting the position of the primary image and generating position identification signals; and, a registration control system for receiving position identification signals, for determining if the primary image is in registration with the lens array, and, if necessary, for generating registration adjustment signals and for transmitting the registration adjustment signals to the orientation adjustment system.

In a further embodiment of the invention, we provide improved digital binocular fusing apparatus. The apparatus includes a lens array comprising a plurality of elongate generally parallel adjacent lenticular sections, each section including at least first and second viewing surfaces each canted with respect to the other; a display mounted behind the lens array and including a plurality of pixels; a system for selectively activating the pixels to produce a primary image, and, a focusing system interposed between the lenticular array and the display.

In still another embodiment of the invention, we provide an improved method for producing a three dimensional image. The method includes the steps of providing a lens array comprising a plurality of elongate generally parallel adjacent lenticular sections, each of the lenticular sections including at least first and second viewing surfaces each canted with respect to the other; providing a display mounted behind the lenticular array and including a plurality of pixels; providing a system for selectively activating the pixels to produce a primary image; and, adjusting the position of the pixels into registration with the lens array.

DETAILED DESCRIPTION OF THE INVENTION

Turning now to the drawings, which illustrate the presently preferred embodiments of the invention for the purpose of illustrating the practice thereof and not by way of limitation of the scope of the invention, and in which like reference characters refer to corresponding elements throughout the several views, FIG. 1 illustrates a flat planar picture 10 of a snowman 90. Axis X is normal to picture 10. If a conventional three-dimensional, three axis X-Y-Z system is imagined, each of the axes is normal to the other two axes and in FIG. 1 axes Y and Z lie in the plane of picture 10, with axis X normal to the Y and Z axes. Camera 11 is at an angle A of six degrees from axis X and lies in the same plane as the Y and X axes. Camera 12 is at an angle B of six degrees from axis X and lies in the same plane as the Y and X axes. As would be appreciated by those of skill in the art, camera 11 can, if desired, be used to photograph picture 10 at multiple different angles A, for example at angles A of two degrees, four degrees and six degrees. In this scenario, camera 11 would produce three different photographs of picture 10 as viewed to the left of axis X. Similarly, camera 12 can be used to photograph picture 10 at multiple different angles B as viewed to the right of axis X. Each of the photographs produced by cameras 11 and 12 can be interpolated in a manner similar to that described below. In the example set forth below, it is assumed for sake of clarity that only two photographs are utilized, one photograph 13 produced by positioning camera 11 at an angle A of seven degrees from axis X, and a second photograph 26 produced by positioning camera 12 at an angle B of seven degrees from axis X. Angles A and B normally are equal to fifteen degrees or less. Angles A and B normally are equal, but need not be.

As illustrated in FIG. 2, photograph 13 is cut into a series 14,16,18 of parallel strips. Photograph 26 is cut into a series 15, 17, 19 of parallel strips. The strips from photograph 13 and photograph 26 are interpolated so that a layer of material 27 is produced in which strips 14, 16, 18 from photograph 13 alternate with strips 15, 17, 19 from photograph 26. A primary image 90A of the snowman 90 is produced on the top surface of layer of material 27.

A lens array 28 is placed on top of material layer 27. The primary image 90A of the snowman 90 is visible through array 28. Array 28 functions to facilitate binocular fusing to the secondary image actually seen by a viewer appears to the viewer to be a three dimensional image. The secondary image is produced by light that travels from primary image 90A outwardly through array 28 to the viewer's eyes.

Array 28 consists of a plurality of elongate parallel adjacent lenticular sections 20. As shown in FIG. 3, each lenticular section 20 includes a first viewing surface (or lens) 21 and a second viewing surface (or lens) 22. Surface 21 is canted with respect to surface 22. A section 20 also includes bottom 23 and triangular end surface 24 and 25. The shape and dimension of each section 20 can vary as desired as long as section 20 contains at least one lens surface viewable with one of a user's eyes and contains at least one other lens surface viewable with the other of the user's eyes.

When an individual's line of sight is generally normal to lens array 28 and picture 27—in the same manner that axis X is normal to picture 10 in FIG. 1—then the individual's right eye 31 can only see 33 the surface 21 of each section 20 and the individual's left eye 30 can only see 32 the surface 22 of each section 20. This phenomenon is generally illustrated in FIG. 4, with the understanding that the orientation of the left and right eyes in FIG. 4 is not normal but is used simply to illustrate that each eye can only view one side of a lenticular section 20.

Figure 5:
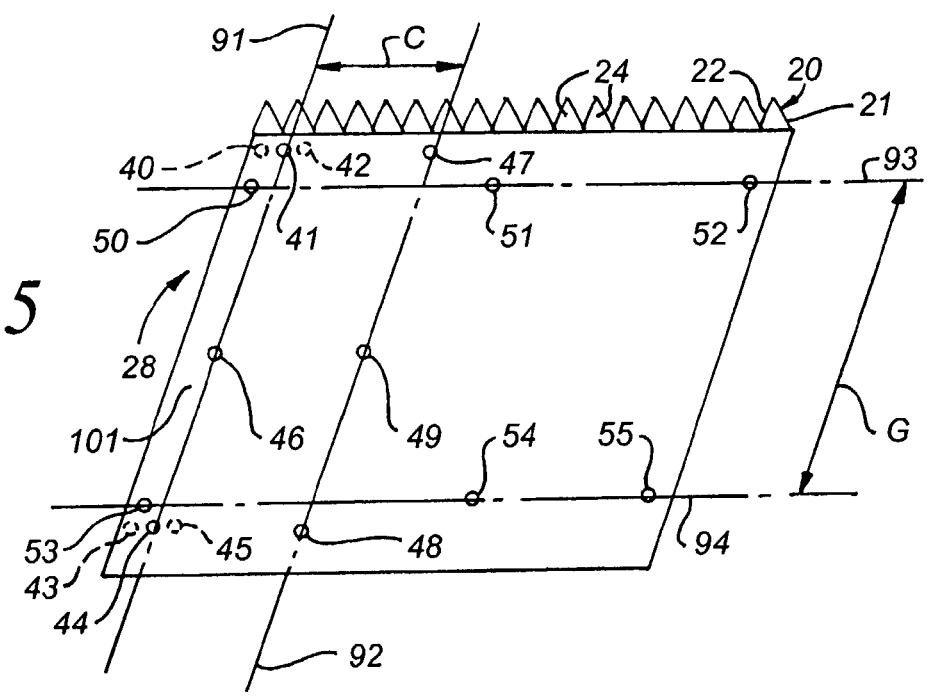
FIG. 5 is a perspective view illustrating sensors mounted on the bottom of the lens array.

In the invention, the lens array 28 is, instead of being fixedly mounted on a layer of material 27 comprised of strips from photographs, mounted on the front of a liquid crystal display, CRT, LED array, or other electronic display 95 (FIG. 6) that selectively activates pixels to generate a primary image. Display 95 can, by way of example and not limitation, be a television screen, a computer screen, a screen on a video game, or some other electronic display screen. In addition, sensors 40 to 55 are integrated in or mounted on the back of array 28 in the manner illustrated in FIG. 5. The sensors can also, if desired, be mounted in a thin film interposed between array 28 and the electronic display 95, can be mounted on or integrated in the display 95, can be mounted on or integrated in a focusing sheet or film interposed between array 28 and the electronic display 95, etc.

As will be described, at a minimum it is preferred to have at least a first pair of sensors 41, 44 that lie along a first vertically oriented line 91 and a second pair of sensors 47, 48 that lie along a second vertically oriented line 92. The first and second lines 91, 92 preferably, but not necessarily, are both parallel to the longitudinal axes of lenticular sections 20. Lines 91 and 92 are spaced apart a distance indicated by arrows C in FIG. 5. In the event horizontal reference lines 93, 94 are utilized, they are spaced apart a distance indicated by arrows G.

Figure 6:
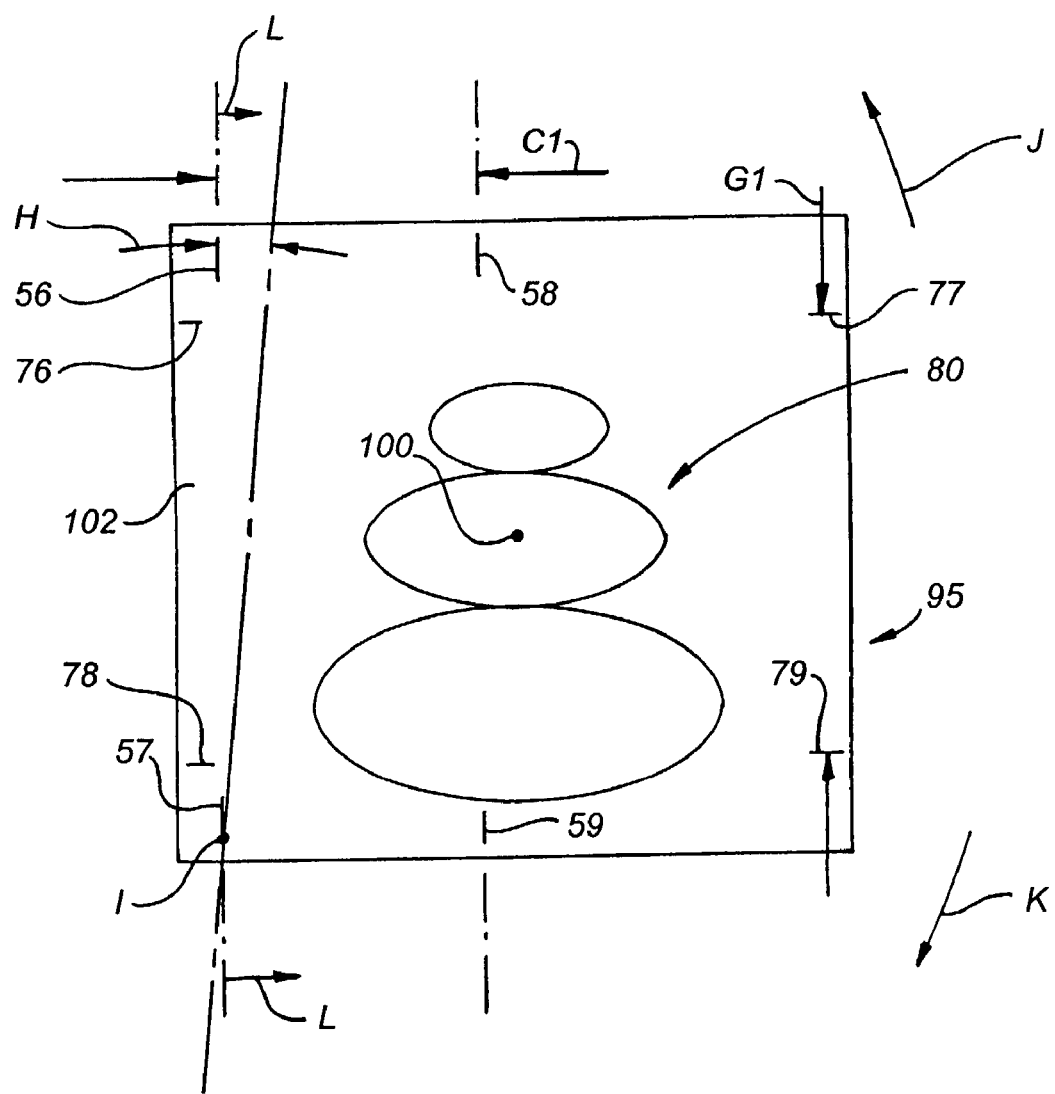
FIG. 6 is a front view illustrating the primary image and reference marks formed by the pixels of a display and illustrating the mode of operation thereof.

An electronic display screen 95 is depicted in FIG. 6. As will be discussed below, a primary image 80 of the snowman 90 is formed on screen 95. Image 80 is, like the primary image 90A, comprised of interpolated strips from two or more pictures. Screen 95 can, as noted, comprise a television screen, a liquid crystal display, a display comprised of LED's, or any other display comprised of electronically controlled pixels. As used herein, a pixel is a source of light having a particular color. Black and white is considered to be a color.

One example of a pixel is a phosphor dot produced in an electron beam in a television. In television screens, pixels are typically bunched in a repeating red-blue-green sequence. In one horizontal line across a television screen, the pixel sequence would be red-blue-green-red-blue-green-red-blue-green, etc.

Another example of a pixel is a liquid crystal that is aligned using an electric field to permit red, green, blue or white light to pass through the crystal.

Another example of a pixel is an LED. A single LED normally produces one color of light.

Apparatus for controlling the pixels, colors, and pictures produced on a television screen or other electronic display 95 are well known in the art and will not be detailed herein. An analog video picture can be received by television equipment that processes the picture and causes appropriate pixels on the television screen to generate light so the analog picture is reproduced on the television screen. Television equipment can also receive a digital picture from a compact disk and cause appropriate pixels on the television screen to generate light so the digital picture is reproduced on the television screen. The pictures produced on a television screen or other display 95 can, as is well known, be still pictures or can be "moving" pictures of the type found in movies.

Similarly, software can be provided which takes digital data defining two or more pictures 13 and 26, manipulates the data to "cut" the pictures into strips 14 to 19 and interpolates the strips in the manner evidenced by the layer of material 27 in FIG. 2 to produce on a display 95 a primary image 80 of the snowman 90. The primary image 80 produced on display 95 in essence reproduces the top surface of each strip 14 to 19 comprising material layer 27. It is the top surface of each strip 14 to 19 in material layer 27 that includes a visible image that comprises in part the primary image 90A formed on layer 27.

In the practice of the invention, a lens array 28 is placed over and in contact with display 95 in the same manner that array 28 is placed over material layer 27 in FIG. 4. A primary image 80 of snowman 90 is produced on the display 95. Vertically oriented reference marks 56 to 59 and horizontally oriented reference marks 76 to 79 are displayed along with the primary image 80. The reference marks 56 to 59 and 76 to 79 are displayed simultaneously with image 80. The display 95 includes or is operatively associated with a system for adjusting the position of image 80.

One way that the position of image 80 is adjusted is by moving the image 80 to the right in the direction indicated by arrows L. Reference marks 56 to 59 move simultaneously with image 80 to the right and are displaced the same distance to the right as image 80.

Another way that the position of image 80 is adjusted is by moving the image 80 to the left in a direction opposite that indicated by arrows L. Reference marks 56 to 59 move simultaneously with image 80 to the left and are displaced the same distance to the right as image 80.

A further way that the position of image 80 is adjusted is by expanding or enlarging image 80. Image 80 is enlarged by expanding image 80 equal amounts (or other selected amounts) in all directions outwardly from the center point 100 of display 95. Reference marks 56 to 59 and 76 to 79 expand simultaneously with image 80 and are typically displaced the same distance as other parts of image 80 that are, prior to the expansion of image 80, the same distance from center point 100 as reference marks 56 to 59 and 76 to 79.

Still another way that the position of image 80 is adjusted is by contracting or shrinking image 80. Image 80 is contracted by contracting image 80 equal amounts (or other selected amounts) in all directions inwardly toward the center point 100 of display 95. Reference marks 56 to 59 and 76 to 79 contract simultaneously with image 80 and are typically displaced the same distance toward point 100 as other parts of image 80 that are, prior to the contraction of image 80, the same distance from center point 100 as reference marks 56 to 59 and 76 to 79.

Yet a further way that the position of image 80 is adjusted is by rotating image 80 about point 100 or about some other selected reference point. Reference marks 56 to 59 and 76 to 79 rotate simultaneously with image 80 and are typically rotated through the same size arc or same distance as other parts of image 80 that are the same distance from center point 100 as reference marks 56 to 59 and 76 to 79.

The apparatus necessary to adjust the position of image 80 (by adjusting the position of the pixels forming the image) in the ways set forth above is known in the art and is not detailed herein.

When image 80 appears on display 95, it is important that the visible image from the top of each strip 14 to 19 is reproduced on display 95 in registration with the lens array 28 that contacts and/or is adjacent display 95. The process for insuring such registration is described below. The following description is facilitated if it is assumed for sake of discussion that in FIG. 4 material layer 27 is display 95 and that the top visible surface of each strip 14 to 19 in fact comprises a visible portion of primary image 80, which visible portion is reproduced by causing selected pixels in display 95 to produce selected colors of light.

When primary image 80 and reference marks 56 to 59 are formed simultaneously on display 95 by activating selected pixels in display 95, sensors 40 to 55 "look" for reference marks to identify the position of the reference marks with respect to the sensors.

If reference marks 56 and 57 line up with, are directly beneath, and are detected by sensors 41 and 44, this indicates that the left hand side 102 of the primary image 80 is properly aligned with sensors on the back of the left hand side 101 of lens array 28, and indicates that strips 14 and 15 are properly positioned directly beneath and in registration with the lenticular section 20 that is shown in FIG. 4 directly above strips 14 and 15.

If, on the other hand, reference marks 56 and 57 are to the left of, but parallel to, sensors 41 and 44, then primary image 80 is, along with marks 56 to 59 moved to the right in the direction of arrows L until marks 56 and 57 are in alignment with sensors 41 and 44.

One way to detect the position of co-linear reference marks 56 and 57 is to have an array of sensors 40 to 42 and 43 to 45 so the sensors can scan a selected horizontal distance to "look" for a reference line 56, 57. Another way to detect the position of marks 56 and 57 is, in the event sensors 41 and 44 do not initially detect marks 56 and 57, to have the control unit move the primary image 80 and reference marks selected increments to the left or right until sensors 41 and 44 detect marks 56 and 57.

If sensor 44 detects mark 57 in alignment with sensor 44, but sensor 41 detects that mark 56 is not in alignment with sensor 41, then the primary image 80 is rotated about a point coincident with sensor 44 until mark 56 is directly beneath and in alignment with sensor 41.

Once marks 56 and 57 are in alignment with sensors 41 and 44, sensors 47 and 48 attempt to detect reference marks 58 and 59. If sensors 47 and 48 detect that marks 58 and 59 are directly beneath and in alignment with sensors 47 and 48, this indicates that each pair of strips 14–15, 16–17, 18–19, is directly beneath and in registration with its associated lenticular section 20. If, on the other hand, sensors 47 and 48 detect that marks 58 and 59 are to the left (or right) of sensors 47 and 48, then the primary image is expanded (or contracted) to bring marks 58 and 59 into alignment and registration with sensors 47 and 48. The primary image 80 can be expanded by expanding image 80 outwardly in all directions from the center point 100, can be expanded in the direction of arrow L from the left hand reference marks 56, 57, etc. After image 80 is expanded, it may be necessary to realign marks 56 and 57 with sensors 41 and 44 and to again check to insure that marks 58 and 59 are in alignment with sensors 47 and 48.

Any desired combination of sensing apparatus and reference marks can be utilized to insure that primary image 80 is in registration with the lens array 28.

When display 95 has a curved surface, or has a thick protective covering over the primary image, it may be advisable to interpose a focusing sheet or device between display 95 and lens array 28. The focusing sheet function to focus light from display 95 at the back of lens array 28. The focusing sheet can be a fresnel lens, a series of concave or convex lens that each lie along vertical lines parallel to each lenticular section, etc.

Figure 7:
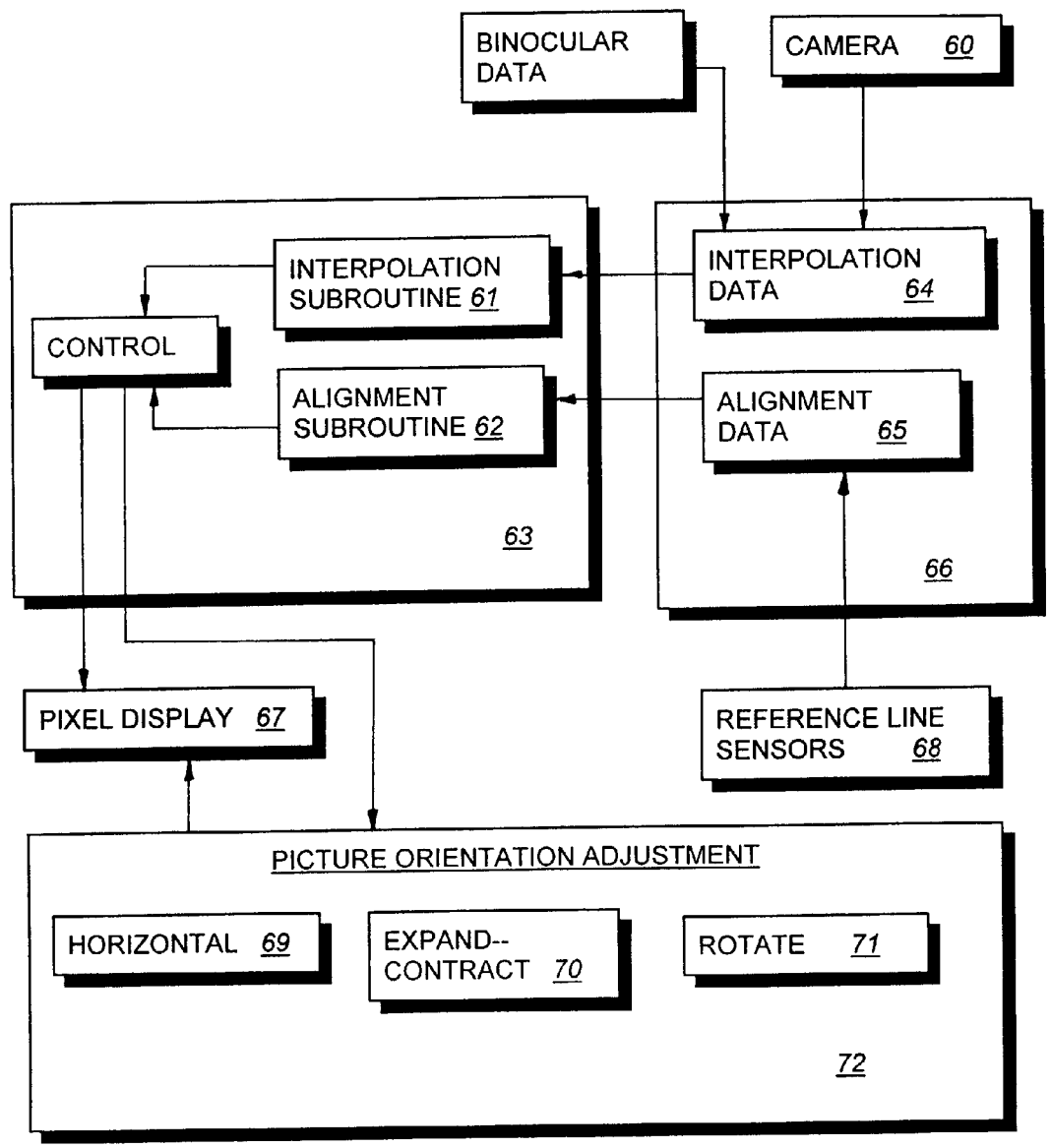
FIG. 7 is a block diagram illustrating operation of apparatus utilized in the practice of the invention.

In use, with reference to FIG. 7, an electronically controlled pixel display 67 is provided. Viewable images are produced on the display 67 by causing selected pixels in the display to emit light. A transparent lens array 28 is mounted on display 67, typically (but not necessarily) with the back of the lens array in contact with the display such that an individual can view through array 28 images produced on the display. Array 28 includes sensors 41, 44, 47, 48. Data from a digital camera 60 for at least a pair of pictures 13, 26 or other data defining a plurality of pictures is directed as interpolation data 64 into memory 66. Each picture 13, 26 is a photograph of the same object or subject matter, but is taken at a different angle in the manner illustrated in FIG. 1. The interpolation subroutine 61 of control 63 takes the interpolation data and interpolates the data in the manner earlier described with reference to FIG. 2 to generate data defining a primary image. Control 63 transmits the primary image data to display 67 to activate appropriate pixels to produce a primary image 80 thereon, along with reference marks 56 to 59.

Reference line sensors 69 (i.e., sensors 41 and 44) search for marks 56 and 57 in the manner earlier described and generate and transmit alignment data 65 to memory 66. The alignment subroutine 62 of control 63 analyzes the alignment data to determine if the position of the primary image 80 and reference marks 56 to 59 needs to be adjusted into registration with array 28 by using a horizontal 69 adjustment (i.e., a left or right movement of image 80) and/or by using a rotate 71 adjustment. If necessary, the picture orientation adjustment 72 is used to horizontally or rotationally adjust image 80 to bring marks 56 and 57 into alignment with sensors 41 and 44.

Once the reference marks 56 and 57 are aligned with sensors 41 and 44, reference line sensors 69 (i.e., sensors 47 and 48) search for marks 58 and 59 in the manner earlier described and generate and transmit alignment data 65 to memory 66. The alignment subroutine 62 of control 63 analyzes the alignment data to determine if the position of the primary image 80 and reference marks 56 to 59 needs to be adjusted by using the expand-contract 70 adjustment of the picture orientation adjustment 72. If necessary adjustment 72 expands or contracts 70 image 80.

Ordinarily, but not necessarily, reference line sensors 68 continuously monitor marks 56 to 59 and to adjust the position of image 80 and marks 56 to 59.

As would be appreciated by those of skill in the art, when a primary image 80 is moving on display 95 not to adjust the position of marks 56 to 59 with respect to sensors 41, 44, 47, 48 but simply as part of the display, then marks 56 to 59 do not move on display 95. If for example, image 80 is scrolling from left to right across display 95, marks 56 to 59 do not move while image 80 is scrolling. Control 63 is able to compensate for and allow such a scrolling movement while continuing to monitor the position of marks 56 to 59 with respect to fixed sensors on the back of fixed array 28.

Figure 8:
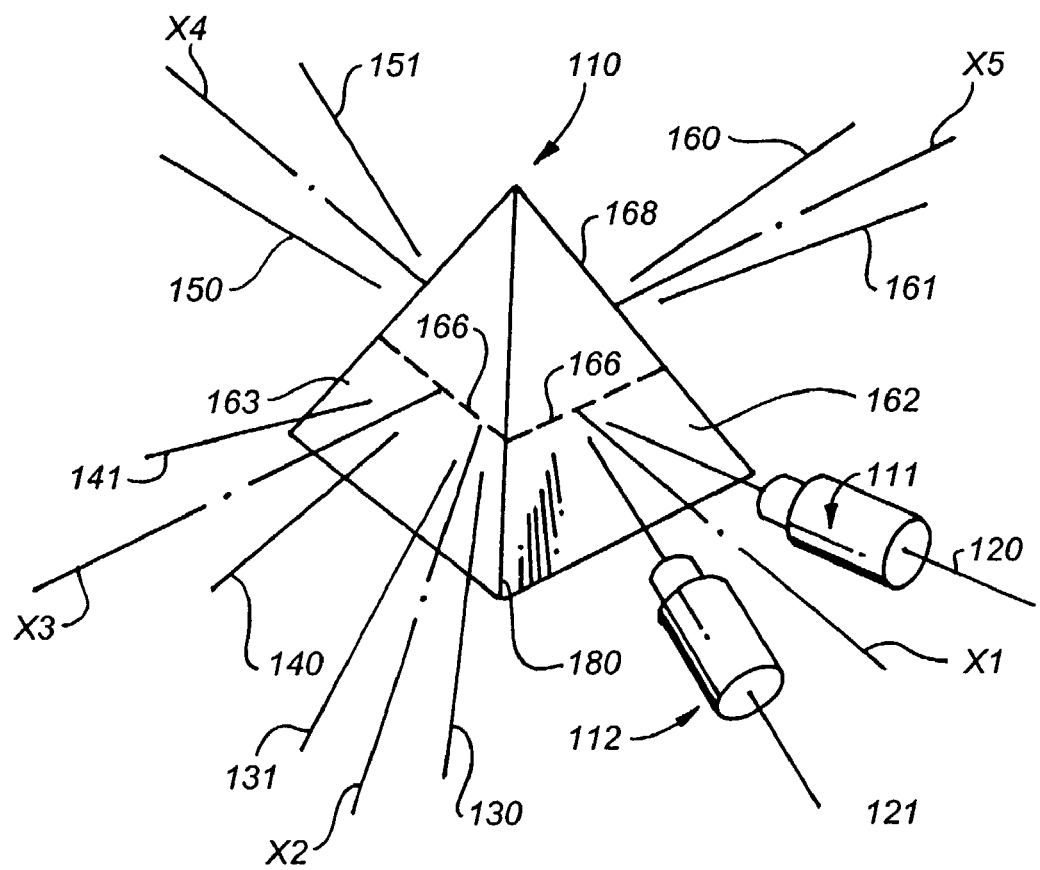
FIG. 8 is a perspective view illustrating an alternate embodiment of the invention; and, FIG. 9 is a perspective view further illustrating an alternate embodiment of the invention.

In an alternate embodiment of the invention, pictures can, as depicted in FIG. 8, be taken from locations circumscribing, or partially circumscribing, an object 110. In FIG. 8, object 10 is a pyramid. Each axis X1, X2, X3, X4, X5 lies in a plane that passes through dashed line 166. Dashed line 166 has the shape of a square. Opposing picture pairs are taken for each axis X1 to X5 in the same manner illustrated in FIG. 1. For axis X1, an opposing pair of pictures is taken of object 110 by positioning camera 112 along line 121 and taking a picture and by positioning camera 111 along line 120 and taking a picture. Lines 120 and 121 are each at an angle of seven degrees from line X1. Similarly, for axis X2, an opposing pair of pictures is taken of object 110 by positioning cameras along lines 130 and 131. Lines 130 and 131 are each seven degrees from axis X2. For axis X3, an opposing pair of pictures is taken of object 110 by positioning cameras along lines 140 and 141. Lines 140 and 141 are each seven degrees from axis X3. For axis X4, an opposing pair of pictures is taken of object 110 by positioning cameras along line 150 and 151. Each line 150 and 151 is seven degrees from axis X4. For axis X5, an opposing pair of pictures is taken of object 110 by positioning cameras along lines 160 and 161. Each line 160 and 161 is seven degrees from axis X5. Lines 120, 121, 130, 131, 140, 141, 150, 151, 160, 161 also lie in the plane that passes through dashed line 166. After an opposing picture pair is taken to either side of each axis X1 to X5, each opposing picture pair is cut or otherwise processing into strips, which strips are integrated in the manner earlier described with reference to FIG. 2.

Since the opposing picture pairs are taken at points circumscribing object 110, a primary image(s) of object 110 can be formed on a cylindrical display or screen 197, or on an arcuate screen which circumscribes an arc extending over less than three hundred and sixty degrees.

Figure 9:
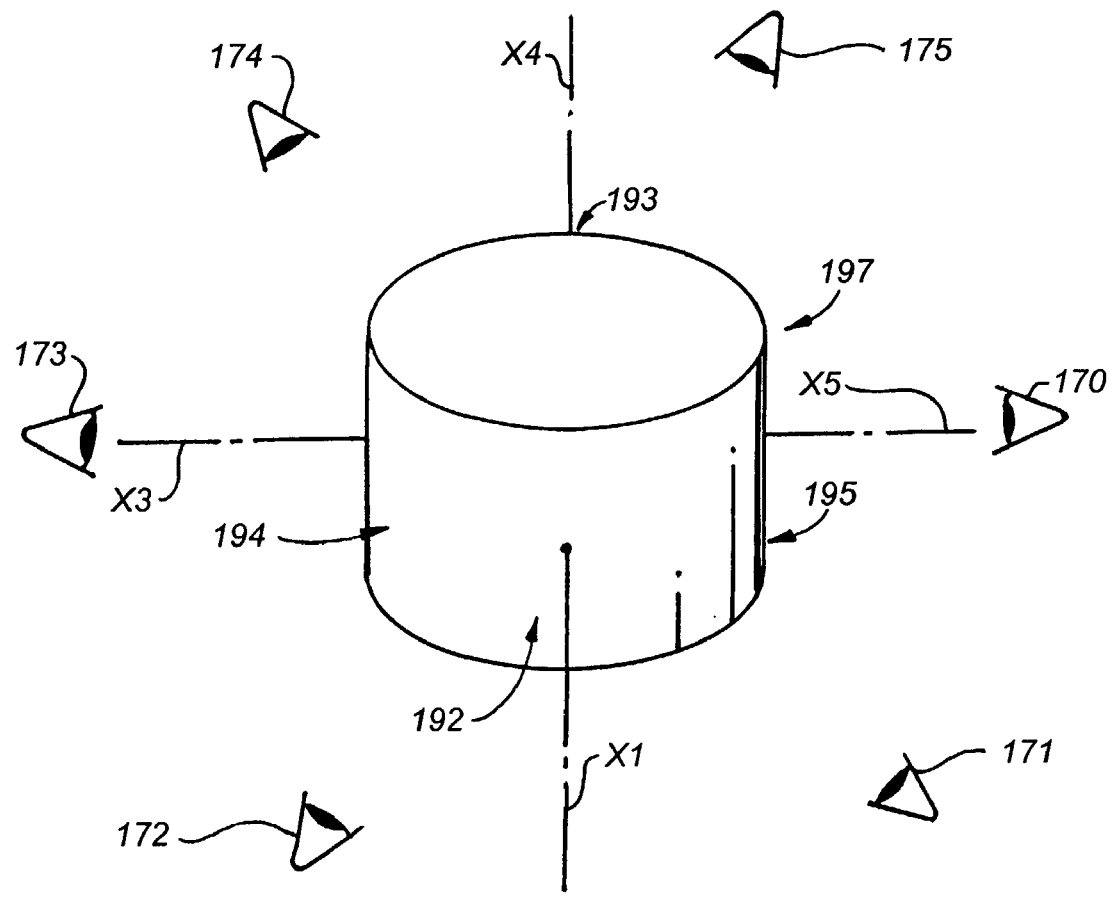

As shown in FIG. 9, an individual can view screen 197 from different positions 170 to 175. If, for example, a viewer looks at side 194 of screen 197 from position 173 along axis X3, then the viewer sees displayed on side 194 the triangular side 163 of object 110 in three dimensions. If the viewer looks at side 195 of screen 197 from position 170 along axis X5, then the viewer sees displayed on side 195 the triangular side 168 of object 110 in three dimensions. Side 168 opposes side 163. If the viewer looks at screen 197 from position 172, he sees displayed on screen 197 in three dimensions triangular sides 162 and 163 and the edge 180 along which sides 162 and 163 co-terminate. If the viewer looks at the front 192 of screen 197 along axis X1, the viewer sees side 162 displayed on the front 192 of screen 197.

Back 193 of screen 197 can be viewed from position 174 or 175.

One area in which the embodiment of the invention illustrated in FIGS. 8 and 9 has application is during the crash testing of vehicles. Using the apparatus of FIGS. 8 and 9 enables an investigator to view a test crash from all sides of a vehicle.

Having described my invention in such terms as to enable those of skill in the art to understand and practice it, and having described the presently preferred embodiments and best mode thereof, I claim:

1. Digital binocular fusing apparatus including
   (a) a lens array comprising a plurality of elongate generally parallel adjacent lenticular sections, each of said sections having a longitudinal axis and including at least first and second viewing surfaces each canted with respect to the other;
   (b) a display mounted behind and contacting said lens array and including
      (i) a plurality of pixels,
      (ii) means for selectively activating said pixels to produce a primary image comprised of a plurality of interpolated parallel image strips taken alternatively from a plurality of pictures of an object, each of said pictures being taken at a different angle with respect to the object,
      (iii) a plurality of reference marks;
   (c) a primary image orientation adjustment system for receiving registration adjustment signals and adjusting the position of said primary image and reference marks with respect to said lens array, said system adjusting simultaneously the position of said primary image and said reference marks such that each of said image strips is in registration with a selected one of said lenticular sections;
   (d) sensor means for detecting the position of said reference marks and generating position identification signals; and,
   (e) registration control means for receiving said position identification signals, determining if said primary image is in registration with said lens array, and, if necessary, generating registration adjustment signals, and transmitting said registration adjustment signals to said primary image orientation adjustment system;
   said sensor means including a plurality of sensors, each of said sensors operatively associated with one of said reference marks;
   said registration control means determining when each of said sensors is in registration with said reference mark operatively associated with said sensor; and,
   said primary image being in registration with said lens array when each of said sensors is registration with said reference mark operatively associated with said sensor.

2. The apparatus of claim 1 wherein said primary image orientation adjustment system adjusts the position of said primary image and reference marks with respect to said lens array by rotating said primary image and reference marks with respect to said lens array.

3. The apparatus of claim 1 wherein said primary image orientation adjustment system adjusts the position of said primary image and reference marks with respect to said lens array by enlarging said primary image.

4. The apparatus of claim 1 wherein said primary image orientation adjustment system adjusts the position of said primary image and reference marks with respect to said lens array by contracting said primary image.

5. The apparatus of claim 1 wherein
   (a) said reference marks each lie along a line parallel to said longitudinal axes of said lenticular sections; and,
   (b) each of said image strips is parallel to said longitudinal axes of said lenticular sections when said image is in registration with said lens array.

* * * * *